April 30, 1963 A. LORENZ Re. 25,375

ARTICLE OF REPOSE FOR SUPPORTING THE BODY OF A PERSON

Original Filed Nov. 8, 1954 6 Sheets-Sheet 1

INVENTOR.
ANTON LORENZ

BY

ATTORNEY.

ARTICLE OF REPOSE FOR SUPPORTING THE BODY OF A PERSON

Original Filed Nov. 8, 1954 6 Sheets-Sheet 2

INVENTOR.
ANTON LORENZ
BY
ATTORNEY.

ARTICLE OF REPOSE FOR SUPPORTING THE BODY OF A PERSON

Original Filed Nov. 8, 1954 6 Sheets-Sheet 3

INVENTOR.
ANTON LORENZ

BY

ATTORNEY.

ARTICLE OF REPOSE FOR SUPPORTING THE BODY OF A PERSON

Original Filed Nov. 8, 1954 6 Sheets-Sheet 4

INVENTOR.
ANTON LORENZ

BY

ATTORNEY.

ARTICLE OF REPOSE FOR SUPPORTING THE BODY OF A PERSON

Original Filed Nov. 8, 1954 6 Sheets-Sheet 5

INVENTOR.
ANTON LORENZ

BY

ATTORNEY.

April 30, 1963 A. LORENZ Re. 25,375

ARTICLE OF REPOSE FOR SUPPORTING THE BODY OF A PERSON

Original Filed Nov. 8, 1954

6 Sheets-Sheet 6

INVENTOR.
ANTON LORENZ

BY

ATTORNEY.

United States Patent Office

Re. 25,375

Reissued Apr. 30, 1963

25,375

ARTICLE OF REPOSE FOR SUPPORTING THE BODY OF A PERSON

Anton Lorenz, Ocean Ridge, Boynton Beach, Fla.

Original No. 2,843,184, dated July 15, 1958, Ser. No. 467,391, Nov. 8, 1954. Application for reissue Oct. 29, 1959, Ser. No. 849,700

13 Claims. (Cl. 297—61)

Matter enclosed in heavy brackets [ ] appears in the original patent but forms no part of this reissue specification; matter printed in italics indicates the additions made by reissue.

This invention relates to articles of furniture and more particularly to articles of repose for supporting the body of a person in which the back-rest is movable relative to a support and may be brought from a sitting position into a reclining position. An object of the invention is to provide an article of repose of the above described type with means for automatically increasing the length of the back-rest when it is brought into the reclining position from the sitting position.

Another object of the invention is to provide an article of repose of the above described type with a separate head-rest movably arranged on the back-rest and with means for the automatic displacement of the head-rest relative to the back-rest when the latter is brought from a sitting position into the reclined position and vice versa.

Another object of the invention is to improve on the construction of articles of repose for supporting the body of a person as now customarily made.

Figure 1:
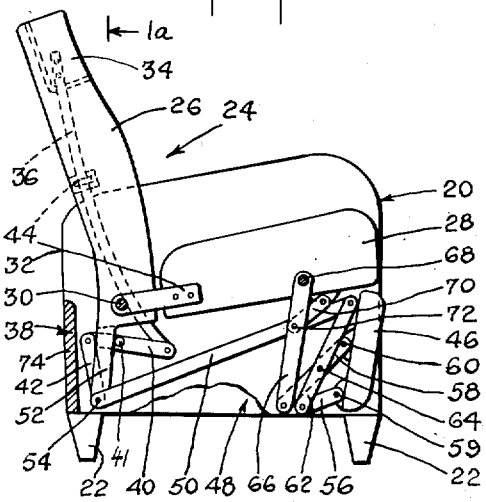
Figure 1A:
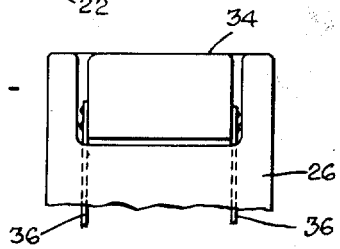
Figure 2:
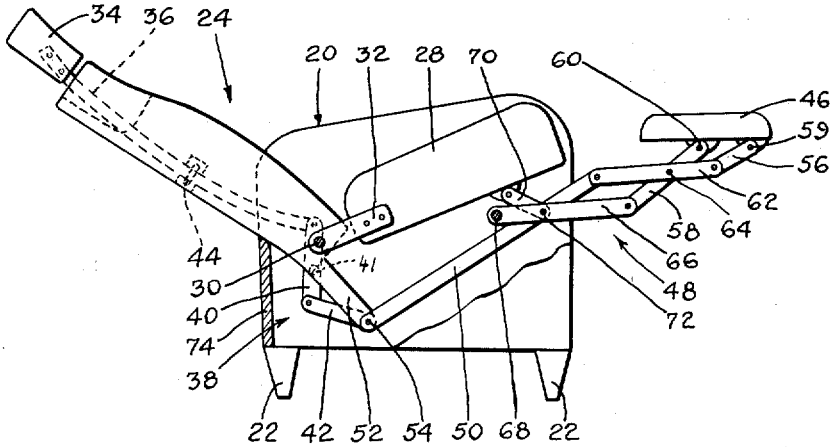
Figure 3:
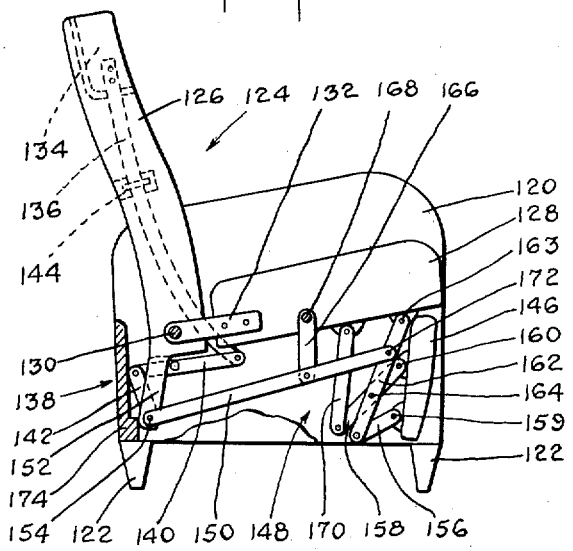
Figure 4:
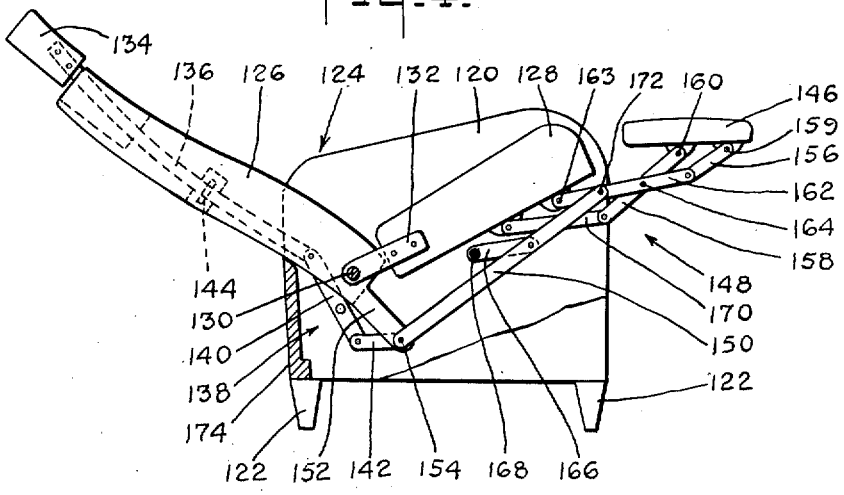
Figure 5:
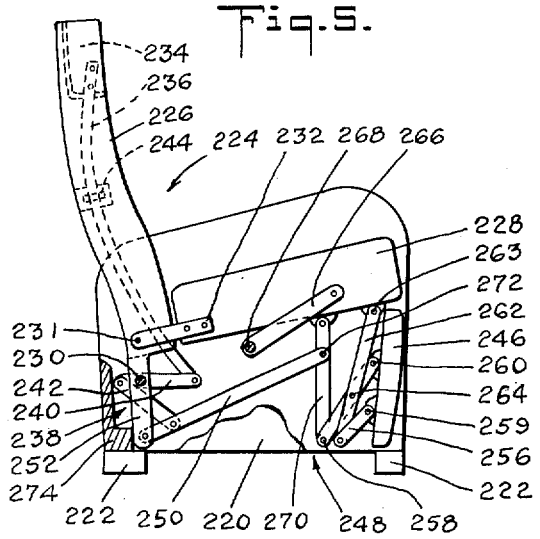
Figure 6:
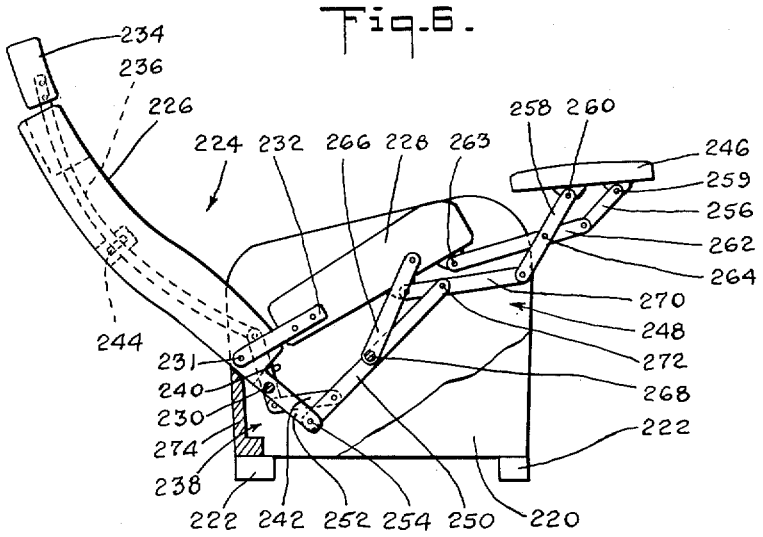
Figure 7:
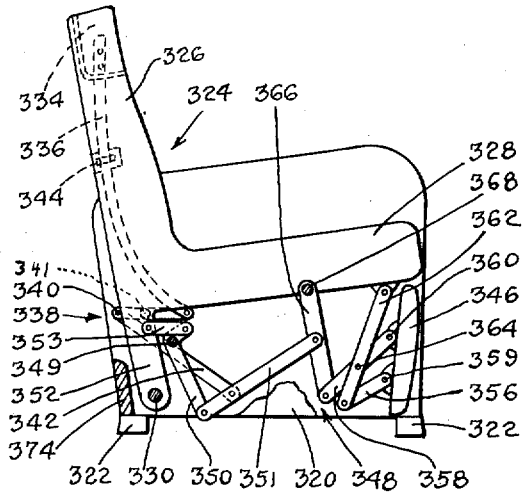
Figure 8:
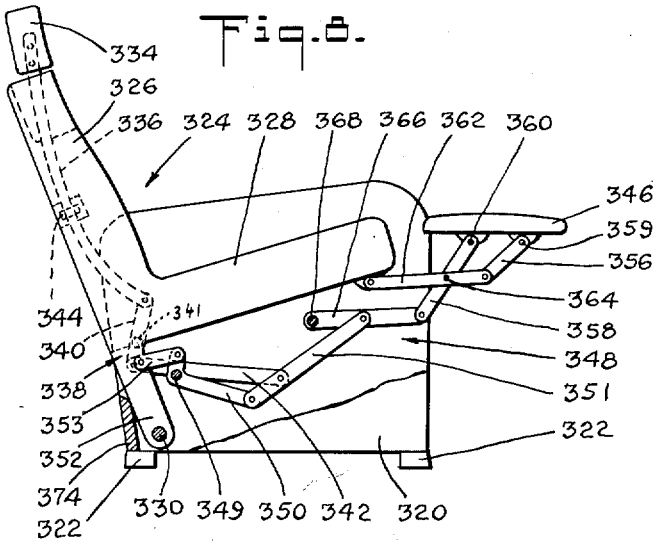
Figure 9:
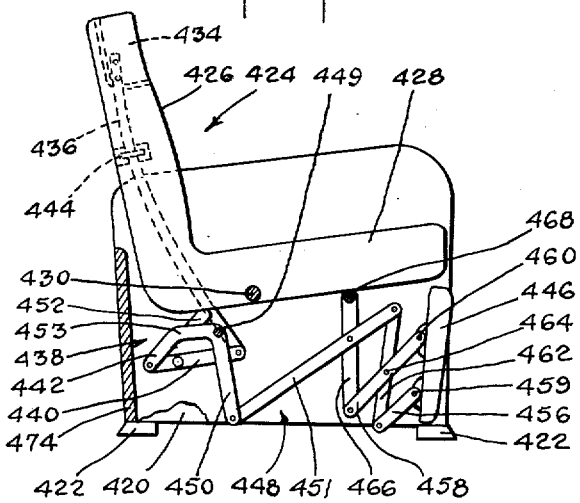
Figure 10:
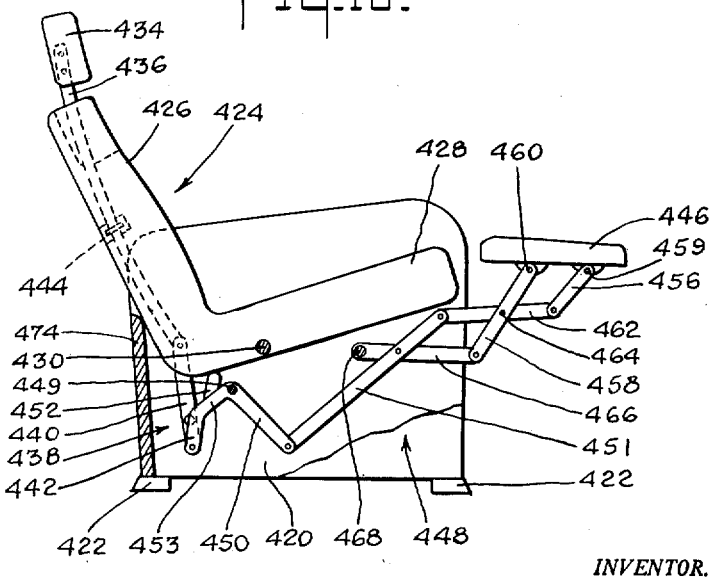
Figure 11:
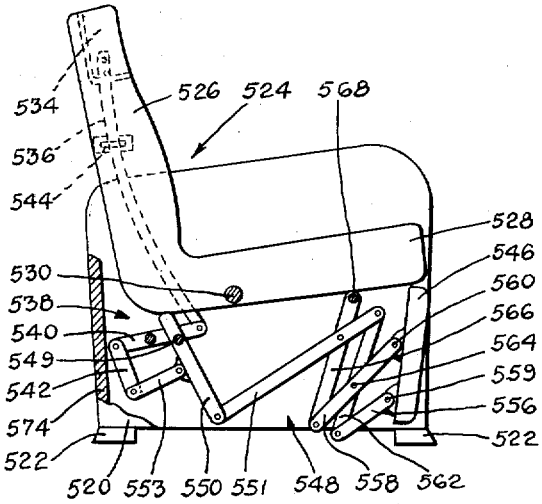
Figure 12:
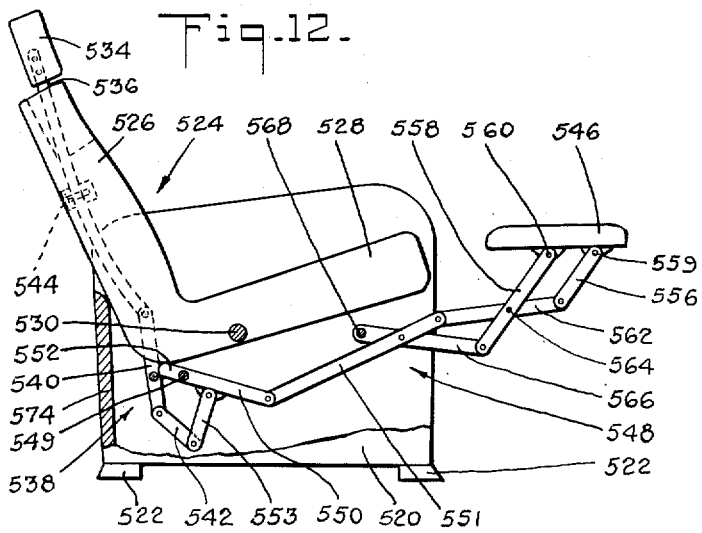

Other objects and constructional details of the invention will be apparent from the following description when read in conjunction with the accompanying drawings forming part of the specification wherein:

FIG. 1 is a side elevational view of an armchair according to the invention with a portion of a side wall being broken away and in which the seat and back-rest structure is in an upright position, FIG. 1*a* is a partial view of FIG. 1 taken in the direction of arrow 1a, FIG. 2 is a side elevational view of the armchair shown in FIG. 1 in a reclining position, FIG. 3 is a different embodiment of an armchair according to the invention, with portions of a side wall being broken away, FIG. 4 is a side elevational view of the armchair shown in FIG. 3 in a reclining position, FIG. 5 is a side elevation of another embodiment constructed in accordance with the principles of the invention, with portions of a side wall being broken away, FIG. 6 is a side elevation of the armchair shown in FIG. 5 with the same in a reclining position, FIG. 7 is a side elevation of a further embodiment of an armchair according to the invention, with portions of a side wall being broken away, FIG. 8 is a side elevation of the armchair shown in FIG. 7 with the same in a reclining position, FIG. 9 is still another embodiment of the armchair in accordance with the invention, with a portion of a side wall being broken away, FIG. 10 is a side elevational view of the armchair shown in FIG. 9 showing the same in a reclining position, FIG. 11 is a side elevation of another embodiment of an armchair according to the invention, with a portion of a side wall being broken away, and FIG. 12 is a side elevational view of the armchair shown in FIG. 11 in a reclining position.

Referring now to FIGS. 1, 1a and 2 of the drawings, the numeral 20 generally indicates a support having legs 22 for supporting a reclining article of furniture having a structure generally identified by the numeral 24. The structure 24 includes a backrest 26 and a seat 28 both of which are rockably mounted on the support 20 about the common axis 30.

In the figures of the drawing it will be understood that the rocking axis 30 is provided through the back-rest 26. the seat 28 has attached to it straps 32 which extend about the rocking axis member 30 to permit the back-rest 26 and the seat 28 to swing relative to each other when the structure 24 is rocked to a reclining position as seen in FIG. 2.

When the structure 24 is rocked to a reclining position both the back-rest 26 and the seat 28 are rocked about the axis 30, the seat 28 being caused to swing relative to the back-rest by a controlling linkage system 48 to be described. On the other hand, when the structure 24 is rocked about the axis 30 to the upright or sitting position, the seat 28 swings relative to the back-rest to its sitting position by the same controlling system. A head-rest 34, FIGS. 1, 1a, 2, slidably engaged in the back-rest is moved relative thereto by a guide 36.

The guide 36 forms a part of a guiding linkage generally identified by the numeral 38. Also included in the guiding linkage 38 is a double-armed lever 40 and a connecting link 42. The double-armed lever 40 is pivoted to the support 20 at 41 intermediate its ends, and is pivotally connected at its one end to the lower end of the guide 36 which is slidably guided in the back-rest 26 by straps 44. At its other end the lever 40 is connected to one end of the connecting link 42. The link 42 forms a connection between the lever 40 and the back-rest 26 of the structure 24 in a manner to be described.

A leg-rest 46 is movable between its inoperative position as shown in FIG. 1 and a leg supporting position as shown in FIG. 2, with the movement of the leg-rest 46 depending upon the extent of the rocking movement of the structure 24. To accomplish this there is provided the linkage system previously noted, which is generally identified by the numeral 48. The linkage system 48 comprises a controlling arm 50 which is connected at one of its ends to a downward extension 52 of the back-rest constrained to move with the back-rest so that it may follow the rocking movements thereof. Both the controlling arm 50 and the connecting link 42 are pivotally connected to the downward extension 52 of the back-rest 26 at 54.

At the other end of the controlling arm 50 the control linkage system comprises a first link 56 and a second link 58 which are pivoted to the leg-rest 46 at spaced regions 59 and 60 respectively thereof. A pivoted connector 62 is connected at one of its ends to the first link 56 and at its other end to the end of the controlling arm 50. Both the pivoted connector 62 and the second link 58 are pivotally interconnected intermediate their ends at 64.

A pivoted arm 66 is mounted on the support at its one end 68 and connected at its other end to the end of the second link 58. A seat link 70 interconnects the controlling arm 50 with the seat 28 of the structure 24. The pivoted arm 66, seat link 70 and controlling arm 50 are all interconnected for relative movement about the point 72.

Provided on the support 20 is a means 74 to limit the rocking movement of the structure 24. Referring to FIG. 1 it will be noted that the extension 52 is limited in movement by the means 74 when the back-rest 26 of the structure 24 is in the sitting position, whereas the back of the structure 24 shown in FIG. 2 is limited in its reclining position also by the limiting means 74, but by a different portion thereof.

When the structure 24 is in the upright or sitting position as shown in FIG. 1, both the head-rest 34 and the leg-rest are drawn into their non-extended positions. As the structure 24 is rocked about the axis mounting 30 and the constrained link 52 of the control linkage system moves away from the limit means 74 the seat 28 is caused to swing relative to the back-rest 26 by virtue of the link 70 connecting the same with the controlling arm 50. At the same time the connecting link 42 of the guiding linkage 38 is caused to follow the constrained link 52 and in turn pivots the double-armed lever 40 to move the guide 36 and the head-rest 34 relative to the back-rest 26 in dependence upon the extent of movement of the structure 24.

The leg supporting position to which the leg-rest 46 is extended also depends upon the extent of the rocking movement of the structure 24. Thus, as the structure 24 rocks from the upright position to a reclining position the extension 52 drives the controlling arm 50. The fixed pivotal connection 68 and the connector 62 causes a relative movement to occur between the pivoted arm 66 and the second link 58 to project the leg-rest 46 to its leg supporting position.

It will be recognized that when the leg-rest 46 is in its leg supporting position it extends beyond the end of the seat 28 and will adequately support the legs and feet of tall persons reclining in the structure 24.

In the embodiment shown in FIGS. 3 and 4 the structure 124, which includes the back-rest 126 and the seat 128, is rockably mounted on the support 120 about the axis 130. The seat 128 swings relative to the back-rest 126 as the structure 124 rocks about the axis 130 in the same manner as described in the embodiment shown in FIGS. 1 and 2. That is, while the structure 124 rocks about the axis 130 the seat 128 which forms a part of the structure 124, swings relative to the back-rest 126 also about the axis 130. Hence, when the back-rest 126 is moved to and from the reclining position as shown in FIG. 4, the seat 128 also moves to and from the reclining position, but at the same time swings relative to the back-rest by virtue of the controlling linkage system 148.

Connecting link 142 is pivotally connected at 154 to the downward extension 152 of the back-rest. This connection is exactly the same as was described with respect to the embodiment shown in FIGS. 1 and 2 and the operation of the members 136, 140 and 142 of the guiding linkage 138 is therefore exactly the same. As the back-rest 126 is moved from the upright sitting position to the reclining position the connecting link 142 which connects the extension 152 with the lever 140, causes the lever 140 to pivot whereby the guide 136 will slide the head-rest 134 relative to and to project the same from the back-rest 126.

Leg-rest 146 is extended to and from its leg supporting positions in dependence upon the rocking movement of the structure 124 by a controlling linkage system 148. The controlling linkage system 148 comprises the controlling arm 150 which is connected at its one end to the extension 152 at 154. Pivotally connected to the leg-rest 146 at one region 159 thereof is a first link 156, while also pivotally connected to the leg-rest 146 at another region 160 thereof is a second link 158. A pivoted connector 162 pivotally connects at its one end to the first link 156 and to the seat 128 at its other end 163. Both the second link 158 and the pivoted connector 162 are interconnected for relative movement intermediate their ends at 164.

Controlling arm 150, being interconnected at 172 with the pivoted connector 162 intermediate the ends thereof, links the same with the downward extension 152 of the back-rest 126. A seat connector 170 pivotally links the second link 158 with the seat 128, while a pivoted arm 166 which is mounted for movement on the support 120 at its one end at 168, is connected at its other end with the controlling arm 150 intermediate the ends thereof.

In order to rock the structure 124 from its upright sitting position as shown in FIG. 3 to its reclining position as shown in FIG. 4, the person sitting in the chair need only lean back heavily on the back-rest 126 and exert a little force thereagainst. The back-rest 126 will then rock about the axis 130 and as it does so the extension 152, being integral therewith is constrained to movement in a counterclockwise direction about the axis 130.

As the extension 152 rocks counterclockwise both the guiding linkage 138 and the controlling linkage system 148 are actuated. As a result the connecting link 142 will pivot relative to the double-armed lever 140 to rock the lever about its mounting. Guide 136, which is pivotally connected to an end of the lever will, in turn, move the head-rest 134 relative to the back-rest. As seen in FIG. 4 when the structure 124 is in its extreme reclining position the head-rest 134 is extended from the back-rest 126. By thus extending the head-rest 134 relative to the back-rest 126 the effective reclining length of the back of the structure 124 is extended to accommodate the full length of the back and head of the person reclining on the structure.

At the same time as the head-rest 134 is extended by the guiding linkage 138, the seat 128 is rocked and swung about the axis 130 relative to the back-rest 126 and the leg-rest 146 is projected to its leg supporting position. This is accomplished by the controlling linkage system 148 through the movement of the controlling arm 150 which is connected at 154 to the downward extension 152. The extent of the swinging movement of the seat 128 is controlled by the portion of the pivoted connector 162 which forms a link between the two pivots 163 and 172, while the direction or manner of movement of the controlling arm 150 is limited by the pivoted arm 166.

In this way, when the link 150 is moved by the extension 152 the pivoted connector 166 pivots about the point 168 and controls the movement of the arm 150 as it swings about its connection 154. The previously mentioned portion of the connector 162 which interconnects the seat 128 at 163 with the controlling arm 150 at the point 172 will cause the seat 128 to swing about the axis 130.

Simultaneously with the movement of the seat, the pivoted connector 162 is extended by the controlling arm 150 to extend the first link 156. By way of the connection 164, the pivoted connector 162 also causes the second link 158 to pivot relative to the seat link 170. This movement of both the first and second links at the same time extends the leg-rest 146 into its proper horizontally disposed leg supporting position.

The support 120 is provided with limiting means 174 in the same manner as described in the operation of the embodiment shown in FIGS. 1 and 2. Hence, the limiting means 174 cooperates with the extension 152 in the sitting position and with the rear of the back-rest 126 in the same manner as described in the operation of the embodiment shown in FIGS. 1 and 2.

Referring now to the embodiment shown in FIGS. 5 and 6 it will be recognized that much of the structure is the same as that shown in the embodiment in FIGS. 1 and 2, and also in FIGS. 3 and 4. As a consequence corresponding elements will be identified by similar numerals, differing only in the prefix numeral. Included in the structure 224 is the back-rest 226 and the seat 228. The structure 224, through the back-rest 226, is rockably mounted on the support 220 about the mounting 230 while the seat 228 swings relative to the back-rest about the pivotal connection 231 by way of straps 232. Thus, when the structure 224 is rocked between its sitting and reclining positions and the back-rest 226 is correspondingly rocked about the axis 230 the seat 228 will swing relative to the back-rest by reason of the controlling linkage system 248 to be described.

A head-rest 234 slidably engages in the back-rest 226 and is moved relative thereto as the structure 224 is rocked to and from its reclining position by a guiding linkage 238. The guiding linkage 238 includes a guide 236, a double-armed lever 240 and a connecting link 242. The double-armed lever 240 is pivoted intermediate its ends at 230 to the support 220 and connected at one of its ends to the lower end of the guide 236. The guide 236 is slidable relative to the back-rest 226 through straps 244, and is connected at its other end to the slidable head-rest 234. Pivotally connected to the other end of the double-armed lever 240 is the connecting link 242 which controls the pivoting movement of the double-armed lever 240 about the mounting 230 in response to movement of the structure 224.

The above mentioned controlling linkage system 248 controls the swinging movement of the seat 228 relative to the back-rest 226 and vice versa, namely the movement of the back-rest 226 with that of the seat 228 in the manner similar to that described in the operation of the embodiments shown in FIGS. 1 and 2, and 3 and 4. A leg-rest 246 is also controlled in its movement to and from its reclining position (FIG. 6) in dependence upon the rocking movement of the structure 224 by the controlling linkage system 248 in a manner which will become obvious as the description proceeds.

Included in the controlling linkage system 248 is a downward extension 252, a controlling arm 250, a pivoted arm 266, seat link 270 and connector link 262, and the first and second links 256 and 258 respectively. The downward extension 252 of the back-rest 226 is constrained to move with the back-rest and is connected at its lower end at 254 to one end of the controlling arm 250. The connecting link 242 of the guiding linkage 238 is connected one end to the controlling arm 250 intermediate the ends thereof and in the region of the connection 254. The other end of the controlling arm 250 pivotally links the seat link 270 at 272 with the downward extension 252 while the pivoting arm 266 is connected at its one end to the seat 228 and mounted at its other end 268 on the support 220.

The three-way linkage formed by the pivoted arm 266, the controlling arm 250 and the portion of the seat connector link 270 which connects the seat 228 to the controlling arm 250 controls the swinging movement of the seat 228 relative to the back-rest 226 when the structure 224 is rocked to reclining position. And vice versa, the rocking movement of the back-rest 226 is controlled by the swinging movement of the seat when the structure 224 is rocked to its sitting position. The first link 256 is pivoted at its one end at 259 to the leg-rest 246 and at its other end to an end of a pivoted connector 262. The pivoted connector 262 is linked to the seat 228 at 263 and intermediate its ends at 264 to a second link 258. One end of the second link 258 which is connected to the leg-rest 246 at a region 260 spaced from the connection of the first link with the leg-rest 246, links the leg-rest with one end of the seat link 270.

Limiting means 274 is provided on the support 220 to limit the rocking movement of the structure 224 between the upright and the reclining positions by engaging with the lower end of the extension 252 when the structure 224 is in the upright position (see FIG. 5) and by engaging with the rear of the back-rest 226 when the structure 224 is in a reclining position as shown in FIG. 6. The limiting function of the member 274 is carried out in the same manner as described in the operation of the previous embodiments.

When the structure 224 is rocked from the upright position as shown in FIG. 5 to a reclining position such as shown in FIG. 6, or to a reclining position approaching that shown in FIG. 6, the relative pivoting movement which takes place between the controlling arm 250 and the extension 252 moves the connecting link 242 to pivot the lever 240 about the axis 230. This movement slides the guide 236 in the back-rest 226 to move the head-rest 234 relative to the back-rest and to a position extended therefrom.

At the same time as the head-rest is being moved the controlling linkage system 248 causes the seat 228 to swing relative to the back-rest 226 about the point 231 while moving the leg-rest 246 to the leg supporting position shown in FIG. 6. The swinging movement of the seat is controlled by the forward movement of controlling arm 250, the limiting pivoting movement of the arm 266 and the portion of the link 270 which links the arm 250 at 272 with the seat 228. As is obvious, the extended position of the leg-rest 246 depends upon the movement of the arm 250 by the extension 252 and as modified by the movement of the seat link 270.

When the structure 224 is rocked to its upright position by weighing heavily on the seat, the controlling linkage system 248 acts upon the extension 252 of the back-rest 226 to rock the same about the mounting 230 to bring the back-rest into its upright position. In turn, the linkage system 248, by way of arm 250 and link 270, withdraws the leg-rest from its leg supporting position. The connecting link 242 also being responsive to the movements of the controlling arm 250, will pivot the lever 240 to draw the guide 236 and the head-rest 234 to move the head-rest from its extended position into the back-rest 226 as shown in FIG. 5.

In the embodiment shown in FIGS. 7 and 8 wherein the structure 324 includes a back-rest 326 and a seat 328, it will be noted that the seat and back-rest form an integral unitary structure which is mounted on the support 320 for rocking movement about the mounting 330. A head-rest 334 slidably engaged in the back-rest 326 is moved to and from an extended position relative thereto by a guiding linkage 338.

The guiding linkage 338 comprises a guide 336, a double-armed lever 340 and a connecting link 342. The guide 336 is movable relative to the back-rest 326 and retained in position relative thereto by straps 344. The lower end of the guide 336 is connected to one end of the double-armed lever 340 which is pivoted intermediate its ends to the support 320 at 341. The lever 340 is then connected at its opposite end to one end of the connecting link 342. Sliding movement of the head-rest 334 into and out of engagement with the back-rest by the guiding linkage 338 is accomplished by way of the connecting link 342 through its connection with the controlling linkage system 348.

Included in the controlling linkage system 348 are two pivotally interconnected controlling arms 350 and 351. The controlling arm 350 is mounted intermediate its ends at 349 on the support 320 for rocking movement relative thereto. The controlling arm 350, being L-shaped, is interconnected at one of its ends with the extension 352 by way of the link 353. The other controlling arm 351 is pivotally connected with a pivoted arm 366 intermediate the ends thereof. The pivoted arm 366 is mounted for movement on the support 368 and links the controlling arm 351 with a second link 358. The second link 358 is connected at its end to the leg support 346 as at 360. A first link 356, also connected to the leg-rest 346 at a different region 359 thereof, links the leg-rest with the seat 328 by way of a pivoted connector 362. Both the pivoted connector 362 and the second link 358 are interconnected intermediate their ends for relative movement at 364.

Limiting means 374 are provided on the support 320 to limit the rocking movement of the structure 324 relative to the support 320 when the structure 324 is rocked into its reclining position (see FIG. 8). The structure 324 is limited in its rocking movement into its upright or sitting position by any suitable means, for example a laterally extending stop or any other structure not shown which may be extended from the support 320.

In the operation of the present embodiment, when the structure 324 is rocked about the rocking mounting 330, the link 353 which connects one end of the controlling arm 350 to the extension 352, will rock the arm 350 in the manner of a bell crank lever to actuate the controlling arm 351. This movement of both controlling arms 350 and 351 is in dependence upon the rocking movement of the structure 324 about the mounting 330.

As the controlling arms 350 and 351 are moved relative to each other the connecting link 342 is also moved. In turn the double-armed lever 340 pivots to move the guide 336 and the head-rest 334 relative to the back-rest 326 while, at the same time, the pivoted arm 366 is rotated about its mounting 368 by the controlling arm 351. Both the first and second links 356 and 358 respectively are then moved relative to each other with the pivoted connector 362 controlling the height of movement of the first link and of the leg support 346 relative to the end of the seat 328.

The structure 324 is limited in its rocking movement into the reclining position by the limiting means 374. Rocking movement of the structure 324 toward its upright position, such as that shown in FIG. 7, will withdraw the leg-rest 346 from its leg supporting position and the head-rest 334 from its extended position by way of the controlling linkage system 348 and the guiding linkage 338 respectively.

The modified embodiment shown in FIGS. 9 and 10 is substantially the same as the embodiment shown in FIGS. 7 and 8 in that the structures 424 includes an integral back-rest 426 and a seat 428. The unitary seat and back-rest structure 424 is mounted for rocking movement on the support 420 at 430. A head-rest 434, like the head-rest disclosed in the embodiment shown in FIGS. 7 and 8, is slidable to and from an engaged position with the back-rest 426. This sliding movement of the head-rest 434 is accomplished through a guiding linkage generally identified by the numeral 438.

The guiding linkage 438 comprises a guide member 436, a double-armed lever 440 and a connecting link 442. The guide 436 is connected at its one end to the head-rest 434 and at its other end to an end of the double-armed lever 440. The double-armed lever 440 is pivoted to the support 420 intermediate its ends and is connected at its other end to the connecting link 442. In the drawings it will be noted that the connecting link 442 is integral with a controlling link 453 and with a controlling arm 450, and that the link 453 and the arm 450 are pivotally mounted for rotation on the support 420 in their area of juncture 449. The controlling link 453 and the controlling arm 450 form a bell crank lever which is pivotable about the mounting 449 in response and to the extent depending upon the rocking movement of the structure 424 in a manner to be described.

The sliding operation of the head-rest 434 is accomplished in response to the pivoting movement of the bell crank lever or double-armed controlling arm 453, 450 as it is caused to pivot about its mounting 449 by the rocking movement of the structure 424. An extension 452 extending upwardly from the arm 453 of the double-armed controlling arm into constant engagement with the lower rear portion of the seat 428 is moved downwardly to rock the bell crank lever when the structure 424 is rocked into its reclining position (FIG. 10). While the structure 424 is rocked into its reclining position and the bell crank lever is caused to pivot about the mounting 449, the connecting link 442 of the guiding linkage 438 moves the double-armed lever 440. The lever pivots about its intermediate mounting to move the guide 436 which is guided in the straps 444 of the back-rest 426. This movement of the parts of the guiding linkage 438 slides the head-rest 434 relative to the back-rest and extends it therefrom. The extent to which the head-rest is extended from the back-rest 426 will depend upon the extent to which the structure 424 is rocked into its reclining position.

A leg-rest 446 is linkingly connected with the bell crank lever 450, 453 for movement thereby. Accordingly, the leg-rest 446 is caused to move to and from its leg supporting position as shown in FIG. 10 by a controlling linkage system 448 in dependence upon the rocking movement of the structure 424.

The controlling linkage system 448 comprises the controlling link 453 and the controlling arm 450, and also includes a first connecting link 456 which is pivotally connected at 459 to the leg-rest and a second connecting link 458 which is pivotally connected to the leg-rest 446 at a different region 460. The first link 456 is then linked to the controlling arm 450 of the bell crank lever by way of a connector link 462 and a controlling link 451. Both the connector link 462 and the controlling link 451 are interconnected at one of their ends for relative pivoting movement.

A pivoted arm 466 is mounted at its one end at 468 for rocking movement on the support 420 and interconnected at its other end with the other end of the second link 458. The second link 458 and the connector link 462 are interconnected intermediate their respective ends at 464 for relative pivoting movement while the pivoted arm 466 and controlled arm 451 are interconnected intermediate their respective ends.

From the above described arrangement it will be clear that as the structure 424 is rocked from its upright or sitting position as shown in FIG. 9 into or toward its reclining position such as that shown in FIG. 10, both the head-rest 434 and the leg-rest 446 will be moved relative to the structure 424 toward their extended supporting positions. On the other hand, when the structure 424 is rocked into its upright or sitting position, from its reclining position, the head-rest 434 will be moved by the guiding linkage 438 from its extended position with the back-rest 426, while at the same time the leg-rest 446 will be withdrawn by the controlling linkage system 448 from its extended leg supporting position to the normal sitting position as shown in FIG. 9.

As described in the embodiment shown in FIGS. 7 and 8 the structure 424 is limited in its rocking movement into the reclining position by the limiting means 474 which engages with the rear portion of the back-rest 426. The structure 424 may also be limited in its rocking movement into its upright or sitting position by a stop (not shown) or by any other suitable laterally extending means fixed to the support 420 which will so limit the movement of the structure 424.

Referring now to the embodiment shown in FIGS. 11 and 12, being substantially the same as that which is shown in FIGS. 7 and 8 and also in FIGS. 9 and 10, the structure 524 includes a back-rest 526 which is formed integral with a seat 528. The seat and back-rest structure is mounted for rocking movement on the support 520 at 530.

A head-rest 534, similar to the head-rests in the above noted embodiments, is slidable to and from an engaged position with the back-rest 526 by a guiding linkage generally identified by the numeral 538.

On each side of the chair there is included in the guiding linkage 538 a guide member 536, a double-armed lever 540 and a connecting link 542. The upper end of each guide 536 is secured to the head-rest 534 while the lower end is pivotally connected to one end of the double-armed lever 540. Straps 544 accurately position and guide the guides 536 in their movement relative to the back-rest 526. The double-armed lever 540 is pivoted intermediate its ends to the support 520 and is connected at its other end to one end of the connecting link 542. The other end of the connecting link 542 is connected to an arm 553 of a bell crank lever which comprises a portion of a controlling linkage system 548 to be described presently.

The bell crank lever or double-armed controlling arm of the controlling linkage system 548 includes a controlling arm 550 having an extension 552 at its one end and a pivot mounting 549 on the support 520. The arm 553 is welded at its one end to the controlling arm 550 intermediate the mounting 549 and the other end of the arm. The other end of the arm 553 is pivotally connected to the end of the connecting link 542 as noted previously.

In FIGS 11 and 12 of the drawings it will be noted that the extension 552 is constantly in engagement with the lower rear portion of the seat 528 and as a consequence moves in response to the rocking movement of the structure 524 as the same rocks about the mounting 530 between its reclining and its sitting or upright positions.

A leg-rest 546 is linkingly connected by the controlling linkage system 548 to the bell crank lever and is moved to and from its leg supporting position in dependence upon the rocking movement of the structure 524 in a similar manner as was described in the embodiment shown in FIGS. 9 and 10. That is, that the first link 556 is connected at its one end to the leg-rest at 559 and at its other end to a connector link 562. A second link 558 is pivotally connected to the leg-rest 546 at another region 560 thereof and at its opposite end to a pivoted link 566. The pivoted link 566 is pivotally mounted on the support 520 at 568 and interconnected intermediate its ends with a controlling link 551. The second link 558 and the connector link 562 are also interconnected for relative movement intermediate their respective ends at 564.

Limiting means 574 engages with the rear portion of the back-rest 526 when the structure 524 is in its reclinging position (FIG. 12) to limit the rocking movement thereof. On the other hand the structure 524 is limited in its rocking movement into its upright or sitting position by a stop (not shown) or any other suitable means fixed on the support 520.

It will be recognized that the operation of moving the leg-rest 546 between its upright or reclining positions is carried out in exactly the same manner as was described previously in the embodiment shown in FIGS. 9 and 10. Similarly, the operation of sliding the head-rest 534 by the guiding linkage 538 is carried out in the same manner as was described in the embodiment shown in FIGS. 9 and 10.

As the structure 524 rocks from its upright or sitting position shown in FIG. 11 to the reclining position shown in FIG. 12 the extension 552 is moved by the rear end of the seat 528 to pivot the bell crank lever 550, 553 about the mounting 549. This movement is transmitted to the connecting link 542 which causes the lever 540 to pivot and to slide the guide 536 and the head-rest 534 relative to the back-rest 526.

In the reverse movement of the structure 524 namely, from the reclining to the upright position the extension 552, remaining in contact with the rear of the seat 528, urges the connecting link 542 by way of the bell crank lever 550, 553 to pivot the lever 540 and slide the guide 536 and the head-rest 534 toward and into its engaged position with the back-rest 526.

I have described preferred embodiments of my invention, but it is understood that this disclosure is for the purpose of illustration and that various changes in shape, proportion and arrangements of parts, as well as the substitution of equivalent elements for those, herein shown and described may be made without departing from the spirit and scope of the invention as set forth in the appended claims.

I claim:

1. A reclining chair comprising: a support, a seat and back-rest having a common rockable mounting on said support, said seat being swingable about said mounting relative to said back-rest, a head-rest slidable relative to said back-rest, a double-armed lever pivoted on said support intermediate its ends, a guide connected at its one end to said head-rest and at its other end to one end of said lever, a link constrained to move with said back-rest, a connecting link connecting said constrained link with the other end of said lever, a leg-rest movable to and from leg supporting positions, a first and second link pivotally connected with said leg-rest, a pivoting link mounted on said support at its one end and at its other end to a selected one of said first and second links, a control arm pivoted at its one end to said constrained link and pivotally connected at its other end with the other of said first and second links, and a seat link pivoted to said seat and to said arm intermediate the ends thereof, said pivoting link being connected intermediate its ends to said arm at said intermediate connection with said seat link.

2. A reclining chair comprising a support, a seat and back-rest structure rockably mounted on said support for movement between an upright sitting position and a rearwardly-tilted reclining position, a head rest, control means mounting said head rest on said chair for movement between a retracted position adjacent to the top of said back-rest and an extended position spaced above the top edge of said back-rest, said control means including a double-armed lever pivotally mounted intermediate its ends on the support, a guide member pivotally connected to one end of said double-armed lever, the head rest being mounted on said guide member, and drive means operatively engaged with the other end of said double-armed lever and with said seat and back-rest structure, said drive means being responsive to movement of said structure for actuation of said double-armed lever to move said head rest to its extended position when the back-rest structure is tilted to its reclined position.

3. A reclining chair comprising a support, a seat and back-rest structure rockably mounted on said support for movement between an upright sitting position and a rearwardly tilted reclining position, a head rest, control means mounting said head rest on said chair for movement between a retracted position adjacent to the top end of said back-rest and an extended position spaced above the top edge of said back-rest, said control means including a double-armed lever pivotally mounted intermediate its ends on the support, a guide member pivotally connected at one end to one end of said double-armed lever, the head rest being fixedly mounted at the other end of said guide member, and means operatively connecting the other end of said double-armed lever to said seat and back-rest structure for actuation of said double-armed lever to move said head rest to its extended position when the back-rest structure is tilted to its reclined position.

4. A reclining chair comprising a support, a seat and back-rest structure rockably mounted on said support for movement between an upright sitting position and a rearwardly-tilted reclining position, a head rest, control means mounting said head rest on said chair for movement between a retracted position adjacent to the top edge of said back-rest and an extended position spaced above the top edge of said back-rest, said control means including a double-armed lever pivotally mounted intermediate its ends on the support, a guide member pivotally connected at one end to one arm of said double-armed lever and extending along the length of said back-rest, the head rest being fixedly mounted at the other end of said guide member, and linkage means operatively connected to the other end of said double-armed lever and drivingly engaged by said seat and back-rest structure for turning movement of said double-armed lever about its pivot mount in response when the back-rest structure is tilted to its reclined position, whereby the guide member is moved longitudinally along said back-rest to bring said head rest to its extended position.

5. A reclining chair according to claim 4 in which said linkage means includes a connecting link pivoted at remote points to said back-rest structure and to said other arm of the double-armed lever.

6. A reclining chair according to claim 4 in which said linkage means includes a connecting link and a controlling arm pivotally connected with each other at adjoining portions, said connecting link being pivoted to said other arm of the double-armed lever and said controlling arm being pivoted to said back-rest structure.

7. A reclining chair according to claim 4 in which said linkage means includes a double-armed controlling arm swingably mounted on said support, a link pivoted to said back-rest structure and to one arm of said double-armed controlling arm at spaced points, a second controlling arm, and a connecting link, said second controlling arm being pivoted at remote points to the other arm of said double-armed controlling arm and to said connecting link, and said connecting link being pivoted to said other arm of the double-armed lever.

8. A reclining chair according to claim 4 in which said linkage means includes a controlling arm swingably mounted on said support, said controlling arm being in abutting engagement with said seat and back-rest structure and being pivoted to said other arm of the double-armed lever.

9. A reclining chair comprising a support, a seat and back-rest structure rockably mounted on said support for movement between an upright sitting position and a rearwardly-tilted reclining position, said back-rest having a depending extension, a head rest, control means mounting said head rest on said chair for movement between a retracted position adjacent to the top edge of said back-rest and an extended position spaced above the top edge of said back-rest, said control means including a double-armed lever pivotally mounted intermediate its ends on the support, a guide member pivotally connected at its lower end to one end of said double-armed lever and extending upwardly along the length of said back-rest, the head rest being fixedly mounted at the upper end of said guide member, and a link pivotally connected to the other end of said double-armed lever and to said back-rest extension for actuation of said double-armed lever to move said head rest to its extended position when the back-rest structure is tilted to its reclined position.

10. A reclining chair comprising a support, a seat and back-rest structure rockably mounted on said support for movement between an upright sitting position and a rearwardly-tilted reclining position, a head rest, control means mounting said head rest on said chair for movement between a retracted position adjacent to the top end of said back-rest and an extended position spaced above the top edge of said back-rest, said control means including a double-armed lever pivotally mounted intermediate its ends on the support, a guide member pivotally connected to one end of said double-armed lever, the head rest being fixedly mounted at the other end of said guide member, means operatively connecting the other end of said double-armed lever to said seat and back-rest structure for actuation of said double-armed lever to move said head rest to its extended position when the back-rest structure is tilted to its reclined position, a leg-rest, and a leg-rest control linkage for moving said leg-rest from a retracted position beneath said seat to an extended position forwardly of said seat, said leg-rest control linkage being coupled to said head rest control means for simultaneous actuation therewith, and movement of said leg-rest to its extended position upon rearward tilting movement of said seat and back-rest structure.

11. A reclining chair comprising a support, a body-supporting structure including a seat and a back-rest rockably mounted on said support for independent movement between a sitting position and a rearwardly-tilted reclining position, a head rest, control means mounting said head rest on said chair for movement between a retracted position adjacent to the top edge of said back-rest and an extended position spaced above the top edge of said back-rest, said control means including a double-armed lever pivotally mounted intermediate its ends on the support, a guide member pivotally connected at one end to one end of said double-armed lever, the head rest being fixedly mounted at the other end of said guide member, linkage means operatively connecting the other end of said double-armed lever to said back-rest for actuation of said double-armed lever to move said head rest to its extended position when the back-rest is tilted to its reclined position, a seat link connected to the forward end of the seat, a connecting link pivotally connected to said seat link and to said back-rest for raising the forward end of the seat upon rearward tilting of said back-rest simultaneously with extension of the head rest.

*12. A reclining chair comprising a stationary frame and a back-rest unit swingably mounted on the frame, a stationary bracket mounted on the frame, a link pivoted to said bracket intermediate its ends, one end of the link being pivotally connected to the unit, a head-rest, a movable frame in the back-rest unit mounting the head-rest, the other end of the link being pivotally mounted to the head-rest mounting frame so that when the back-rest unit is swung upon the frame toward reclining position, the link is pivoted and causes the head-rest frame to move relative to the back-rest to project the head-rest from a concealed position within the back-rest.*

*13. The reclining chair of claim 12 including cam means in the back-rest in position to force the head-rest and its supporting frame in a forward direction during the motion of the head-rest frame.*

References Cited in the file of this patent or the original patent

| | | |
|---|---|---|
| 120,064 | Haupt | Oct. 17, 1871 |
| 154,873 | Leas | Sept. 8, 1874 |
| 467,756 | Sandburg | Jan. 26, 1892 |
| 530,092 | Daniels | Dec. 4, 1894 |
| 2,672,919 | Luckhardt | Mar. 23, 1954 |

FOREIGN PATENTS

| | | |
|---|---|---|
| 19,394 | Sweden | May 13, 1905 |